United States Patent
Pfefferkorn et al.

(10) Patent No.: US 11,702,219 B2
(45) Date of Patent: Jul. 18, 2023

(54) AIR DIRECTION ARRANGEMENT FOR AN AIRCRAFT WITH INTEGRATED HEAT EXCHANGER

(71) Applicant: Airbus Defence and Space GmbH, Taufkirchen (DE)

(72) Inventors: Martin Pfefferkorn, Taufkirchen (DE); Robert Ehrmayr, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 4 days.

(21) Appl. No.: 17/497,080

(22) Filed: Oct. 8, 2021

(65) Prior Publication Data

US 2022/0111973 A1    Apr. 14, 2022

(30) Foreign Application Priority Data

Oct. 9, 2020 (DE) .................. 10 2020 006 235.0

(51) Int. Cl.
    *B64D 33/02*          (2006.01)
    *B64D 13/06*          (2006.01)

(52) U.S. Cl.
    CPC ...... *B64D 33/02* (2013.01); *B64D 2013/0618* (2013.01); *B64D 2013/0622* (2013.01); *B64D 2033/024* (2013.01); *B64D 2033/026* (2013.01); *B64D 2033/0273* (2013.01)

(58) Field of Classification Search
    CPC ...... B64D 2033/0273; B64D 2033/024; B64D 2013/0618; F02C 7/04; F02C 7/057
See application file for complete search history.

(56) References Cited

U.S. PATENT DOCUMENTS

| | | | |
|---|---|---|---|
| 2,625,009 A | 1/1953 | Leggett et al. | |
| 4,477,039 A * | 10/1984 | Boulton ................ | B64D 33/02 137/15.1 |
| 5,967,461 A | 10/1999 | Farrington | |
| 7,861,512 B2 | 1/2011 | Olver et al. | |
| 10,773,817 B1 | 9/2020 | Brennen et al. | |

(Continued)

FOREIGN PATENT DOCUMENTS

| | | | |
|---|---|---|---|
| EP | | 2955111 A1 | 12/2015 |
| WO | WO 2020/043977 A1 | | 3/2020 |

OTHER PUBLICATIONS

European Search Report for Application No. 102020006235 dated Oct. 12, 2020.

(Continued)

*Primary Examiner* — Joshua J Michener
*Assistant Examiner* — Ka Chun Leung
(74) *Attorney, Agent, or Firm* — KDW Firm PLLC

(57) ABSTRACT

An air direction arrangement for an aircraft. The air direction arrangement contains an inlet opening and an inlet channel connected thereto and which is at least partially surrounded by an outer wall. The inlet channel is configured to guide air to an engine of the aircraft. The outer wall contains at least one outlet channel and at least one outlet element. The outlet element is configured to selectively release or close the outlet channel for an air flow from the inlet channel into the environment of the aircraft. The air direction arrangement contains a heat exchanger in the outlet channel to discharge thermal energy to the air flow which is flowing from the inlet channel into the environment of the aircraft.

9 Claims, 2 Drawing Sheets

(56) References Cited

U.S. PATENT DOCUMENTS

| | | | |
|---|---|---|---|
| 2007/0245738 A1 | 10/2007 | Stretton et al. | |
| 2008/0006022 A1 | 1/2008 | Schwarz et al. | |
| 2008/0245062 A1 | 10/2008 | Dionne | |
| 2011/0001019 A1 | 1/2011 | Bouldin et al. | |
| 2013/0175001 A1 | 7/2013 | Cheong | |
| 2019/0014687 A1* | 1/2019 | Snyder | H05K 7/209 |
| 2019/0055902 A1* | 2/2019 | Stone | F02K 1/763 |
| 2019/0226400 A1 | 7/2019 | Geliot et al. | |
| 2019/0285000 A1* | 9/2019 | Geliot | B64D 27/18 |

OTHER PUBLICATIONS

European Search Report for Application No. 102020006235 dated Sep. 24, 2021.
European Search Report for Application 21200033 dated Feb. 10, 2022.

* cited by examiner

AIR DIRECTION ARRANGEMENT FOR AN AIRCRAFT WITH INTEGRATED HEAT EXCHANGER

CROSS-REFERENCE TO RELATED APPLICATION

This application claims priority to German Patent Application No. 10 2020 006 235.0 filed Oct. 9, 2020, the entire disclosure of which is incorporated by reference herein.

TECHNICAL FIELD

The disclosure herein generally relates to the technical field of air travel, and in particular to the technical field of thermal management in an aircraft. In particular, the description relates to an air direction arrangement for an aircraft and an aircraft having such an air direction arrangement.

BACKGROUND

In aircraft, as a result of a large number of technical components, there is excess heat which has to be discharged. In order to discharge heat from a heat source, a cooling medium is generally used. This cooling medium absorbs thermal energy from the component which is intended to be cooled and discharges the thermal energy. In order to discharge the thermal energy from the cooling medium, for example, a heat exchanger is used.

A heat exchanger generally has two regions which are separate from each other, wherein a medium with a higher temperature flows through a first region and a medium with a lower temperature flows through a second region. Thermal energy from the medium in the first region is discharged to the medium in the second region.

For example, a heat exchanger can be used in order to cool engine bleed air by ram air for use in a cabin of an aircraft. A structure of a corresponding system and the heat exchanger considered for this purpose is described in EP 2 955 111 A1. EP 2 955 111 A1 relates to cooling engine bleed air which is introduced into the aircraft. Of course, heat exchangers can also be used to discharge other thermal energy which is intended to be discharged from the aircraft to the environment. For this application, air from the environment of the aircraft is used for the cooling. To this end, corresponding openings are required in or on the fuselage of the aircraft.

During the flight, operating conditions may occur in which the engine inlet channel is capable of providing the engine with a greater quantity of air than it requires. Under these conditions, an accumulation is produced by the engine inlet channel. In this instance, there is applied in the inlet channel an excess pressure (a pressure which exceeds a predetermined threshold value) which can contribute to an increased air resistance of the aircraft and outlet flaps are opened in order to decrease the air resistance of the aircraft.

SUMMARY

It can be considered to be an objective to improve the discharge of thermal energy from an aircraft and in particular to improve the construction of a corresponding arrangement.

This object is achieved by the subject-matter disclosed herein.

According to one aspect, an air direction arrangement for an aircraft is set out. The air direction arrangement has an inlet opening and an inlet channel which is connected thereto and which is at least partially surrounded by an outer wall or the fuselage. The inlet channel is configured to guide air to an engine of the aircraft and is therefore also referred to as an engine inlet channel. The outer wall of the engine inlet channel has at least one outlet channel and at least one outlet element, wherein the outlet element is configured to selectively release or close the outlet channel for an air flow from the engine inlet channel into the environment of the aircraft. The air direction arrangement has a heat exchanger which is arranged in the outlet channel in order to discharge thermal energy to the air flow flowing from the inlet channel into the environment of the aircraft.

The outlet channel which can also be referred to as an outlet opening can be selectively closed or released with the outlet elements. In the closed state, all of the air flowing in the inlet channel flows to an engine of the aircraft. In the released state, a portion of the air mass flow in the inlet channel is discharged through the outlet channel into the environment of the aircraft again.

The air direction arrangement may have one or more outlet elements. The principles of this description can be applied regardless of the number, size, shape of the outlet elements.

The outlet element may, for example, be configured as an outlet flap or as an outlet valve. In the description of some embodiments, reference is made below to the outlet flap. However, this does not mean that the description is limited to the outlet flaps. Instead, the person skilled in the art will understand that the outlet flaps described can be replaced in an appropriate manner by other outlet elements, for example, outlet valves.

The outlet valves are configured to be moved by an actuator from a closed position into an open position and vice versa, Alternatively, the air flow can also be controlled by a valve, wherein a valve also has a closed position and an open position, depending on whether it is permeable to an air flow or not. The outlet flaps may be supported in an articulated manner in the outer wall of the air direction arrangement or the aircraft. An actuator, for example, an electrohydraulic drive or another type of actuation member is connected to the outlet flap by a mechanism (for example, a shaft, a rod, a lever, etcetera). The actuator is controlled by a control unit and supplied with a command signal so that the control unit causes the actuator to move the outlet flap into a predetermined position. The outlet flap can, for example, assume any opening angles or positions between the closed position and the maximum open position and can be held in these opening angles. The opening angle of the outlet flap can be freely predetermined in the region between the closed position and maximum open position. Consequently, the air mass flow leaving the outlet channel can be predetermined or varied.

Generally, the outlet flap is moved from the closed position into an open position when the air mass flow entering the inlet channel is too high for the engine. In this instance, there is applied in the inlet channel an excess pressure (a pressure which exceeds a predetermined threshold value), which can contribute to an increased air resistance of the aircraft and the outlet flaps are opened in order to decrease the air resistance of the aircraft.

The air direction arrangement described herein is characterized in particular in that a heat exchanger is arranged in the outlet channel in the outer wall of the air direction arrangement. The air which is discharged into the environment flows through this heat exchanger when the outlet flap(s) is/are in an open position. Consequently, excess thermal energy can be discharged to the air which is discharged in any case into the environment of the aircraft.

This structure has, inter alia, the property that the additional cooling mechanisms used in the thermal management of the aircraft can be configured to be smaller or that the heat exchanger arranged in the outlet channel in the environment of the aircraft provides additional cooling power in addition to the remaining cooling mechanisms provided. In particular, the inlet openings for cooling channels in the outer skin of the aircraft can be configured to be smaller, the number of openings associated with a cooling circuit of the aircraft in the outer skin of the aircraft can be reduced or inlet openings for cooling channels can be completely dispensed with, whereby a radar signature of the aircraft is minimised. This may particularly have advantages for military aircraft, which are subject to the requirement of a small radar signature.

According to an embodiment, the heat exchanger is arranged outside a flow cross section which is at least partially surrounded by the inlet channel between the inlet opening and the engine.

The heat exchanger consequently does not impair the air flow from the inlet opening to the engine. The inlet channel further remains free and there is no increased flow resistance, which is caused by the heat exchanger, in the air mass flow to the engine. Instead, the heat exchanger is arranged in the outlet channel and cool air flows around it only when the outlet flap is open. The heat exchanger may be arranged in the outlet channel in such a manner that the air flow in the inlet channel flows to the engine substantially past the heat exchanger and does not discharge any thermal energy from the heat exchanger. This may, for example, be achieved by the heat exchanger being constructed or integrated in the outlet channel in such a manner that only the air which flows transversely relative to the inlet channel through the outlet channel flows through the heat exchanger.

According to another embodiment, the heat exchanger is arranged in a direction which extends perpendicularly to a flow direction of the air flow in the inlet channel between an inner side and an outer skin of the outer wall.

The heat exchanger is not enclosed between or surrounded by the inner side and the outer skin, but instead a height of the heat exchanger is lower than a width of the outer wall (that is to say, wall thickness) so that the inner side of the outer wall is closer to the fuselage of the aircraft than the heat exchanger and the outer skin is further away from the fuselage of the aircraft than the heat exchanger. In other words, the heat exchanger protrudes neither into the flow cross section of the inlet channel nor from the outlet channel into the environment of the aircraft, but instead is embedded in the outlet channel in the outer wall.

According to another embodiment, the air direction arrangement has a plurality of outlet elements which together close an outlet channel in which the heat exchanger is arranged.

If, when outlet flaps are used as outlet elements, the number of outlet flaps is increased, each individual outlet flap may be sized to be smaller. Consequently, the outlet flap protrudes in an open position to a lesser extent from the outer skin of the aircraft into the air which is flowing around the aircraft so that the properties of the aircraft during flight are impaired to a lesser extent. The air direction arrangement may be configured in such a manner that a plurality of outlet flaps together cover an individual outlet channel when the outlet flaps are in the closed position. A plurality of such outlet channels which are each covered by a plurality of outlet flaps may be provided in the air direction arrangement. Alternatively, it is conceivable for an outlet flap to cover or, generally speaking, close an individual outlet channel. This parameter is a question of the design and can be selected by the person skilled in the art taking into account other parameters.

According to another embodiment, the air direction arrangement has a plurality of outlet channels, wherein at least one heat exchanger is arranged in at least two outlet channels.

A heat exchanger may be arranged in each outlet channel in order to increase the potential cooling power. It is conceivable that of several outlet channels only some contain a heat exchanger. Vice versa, a plurality of heat exchangers may be contained in an outlet channel.

An outlet channel in the context of this description is intended to be understood to be an outlet opening from the inlet channel into the environment of the aircraft. A specific aspect is that the excess air which is discharged from the inlet channel into the environment of the aircraft is used for the purposes of cooling.

According to another embodiment, the heat exchanger is a plate heat exchanger.

A plate heat exchanger is characterized by a compact construction and an advantageous ratio of weight to surface-area and is consequently particularly suitable for use in an aircraft. However, reference may be made to the fact that, in addition to a plate heat exchanger, other heat exchangers which are suitable for discharging thermal energy of a cooling medium to the air flowing around the heat exchanger or another fluid can also be used.

According to another embodiment, the air direction arrangement further has an actuation member which is mechanically coupled to an outlet flap, wherein the actuation member is configured to move the outlet flap from a closed position into an open position.

The outlet flap is, for example, supported in an articulated manner in the outer wall. The actuation member is coupled to the outlet flap either directly or via a force transmission mechanism (for example, a rod, a lever, a shaft). The actuation member may move the outlet flap into a specific opening angle which is located between the closed position and a maximum open position.

According to another embodiment, the outlet element is an outlet flap and the outlet flap extends in a closed position flush with an outer skin of the outer wall.

In other words, the outlet flap closes the outlet channel in the closed position in such a manner that the outer skin and the outer flap substantially form a uniform and virtually continuous outer face of the aircraft. In this state of the outlet flap, cooler air does not flow around the heat exchanger and consequently also does not provide any cooling power. In order nonetheless to be able to discharge excess thermal energy, an aircraft with an air direction arrangement which is constructed in accordance with the principles described herein has additional cooling mechanisms.

According to another aspect, there is set out an aircraft which has a fuselage and an air direction arrangement which is arranged on or in the fuselage. The air direction arrangement is an air direction arrangement according to an embodiment described herein. Furthermore, the aircraft has an engine. The air direction arrangement is arranged in such a manner that it supplies the engine with air.

The air direction arrangement thus absorbs air via the inlet opening which is arranged on the fuselage of the aircraft and guides this air to the engine so that the engine can provide a required drive energy. Any air which is absorbed from the environment of the aircraft for the purposes of cooling is generally absorbed via inlet openings in the outer skin of the aircraft. However, such inlet openings typically have a negative influence on the radar signature of an aircraft, where applicable also on the air resistance. Consequently, the presence of inlet openings, in particular in military aircraft, may be disadvantageous.

The construction of the air direction arrangement described in this instance to some degree enables the dual use of an inlet opening of engine air. If excessive air has been absorbed in the inlet channel to the engine, this is discharged via outlet flaps into the environment. The heat exchanger arranged in the outlet channel of the air direction arrangement discharges thermal energy to this discharged air. Consequently, the number and/or the size of inlet openings used in a dedicated manner for the cooling in the fuselage of the aircraft can be reduced.

According to an embodiment, the aircraft is a jet aircraft and the engine is a jet engine or a ramjet engine.

The structure of the air direction arrangement described herein and the aircraft is particularly suitable for use in jet aircraft or military combat aircraft. Such aircraft are distinguished by a compact construction type and a comparatively high cooling requirement since they contain a large number of components with a cooling requirement. Conversely, it is desirable for such aircraft to have the minimum possible radar signature.

BRIEF DESCRIPTION OF THE DRAWINGS

Embodiments will be discussed in greater detail below with reference to the appended drawings. The illustrations are schematic and not true to scale. The same reference numerals refer to elements which are identical or similar. In the drawings.

DETAILED DESCRIPTION

Figure 1:
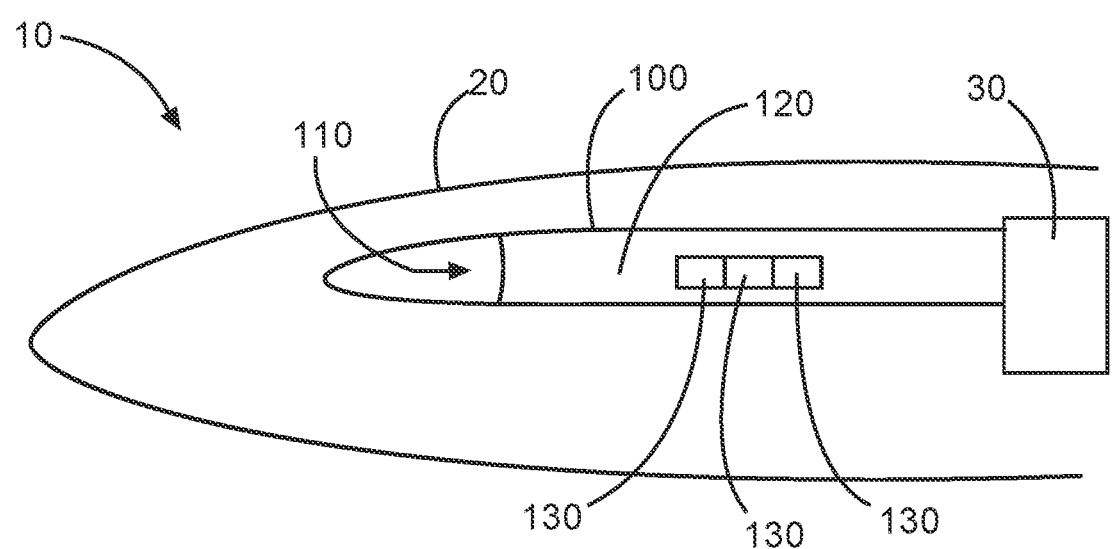
FIG. 1 is a schematic illustration of an aircraft having an air direction arrangement according to an embodiment.

FIG. 1 is a schematic illustration of an aircraft 10. Of the aircraft 10, substantially the fuselage 20 is shown. An air direction arrangement 100 and an engine 30 are arranged on or in the fuselage 20. The air direction arrangement 100 extends along the fuselage 20 in the flow direction of the ambient air when the aircraft 10 is in flight. The air direction arrangement 100 may in principle be arranged at any position on the fuselage. For example, the air direction arrangement 100 is arranged at the top, at the rear, laterally or at the lower side of the fuselage 20.

The air direction arrangement 100 absorbs ambient air via the inlet openings 110 and directs the ambient air to the engine 30, which uses the ambient air for an operation for producing drive energy.

The air direction arrangement 100 has an outer skin 120 which represents the outer surface of the air direction arrangement 100. The outer skin 120 may be the same face as the outer skin of the fuselage 20, then the inlet channel is integrated in the fuselage. At least one outlet flap 130 is arranged in the outer skin 120. In this instance, three outlet flaps 130 are shown, wherein this number has been selected merely by way of example and more or fewer than three outlet flaps can be used.

The outlet flaps 130 are moved from a closed position into an open position when excess air from the air direction arrangement has to be discharged into the environment.

Figure 2:
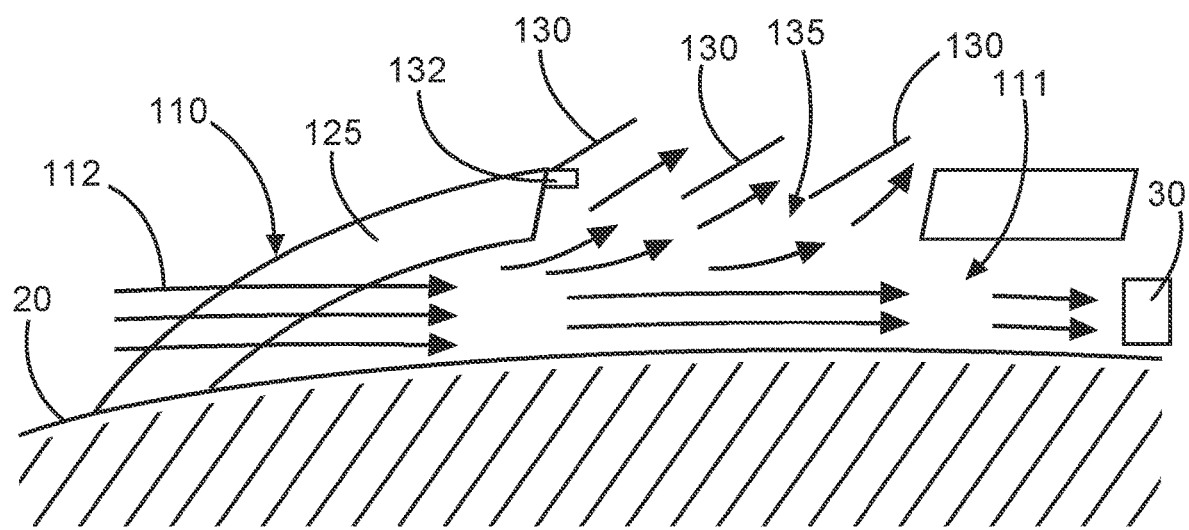
FIG. 2 is a schematic illustration of an air direction arrangement according to another embodiment.

FIG. 2 is a schematic cross-sectional illustration of an air direction arrangement 100 which is arranged on or in the fuselage 20. The outer wall 125 of the air direction arrangement extends from the fuselage 20 so that between the fuselage 20 and the outer wall 125 the inlet opening 110 of the air direction arrangement 100 is formed. During flight, the air flow 112 flows into the inlet opening 110 and flows through the inlet channel 111 to the engine 30.

In the outer wall 125 there is an outlet channel 135 which can be closed or released by three outlet flaps 130. In FIG. 2, the outlet flaps 130 are shown in an open position. In the open position, a portion of the air flow 112 can escape from the inlet channel 111 through the outlet channel 135 into the environment of the aircraft, as indicated by the corresponding arrows.

The air direction arrangement 100 has an actuation member 132, which is mechanically coupled to an outlet flap 130. The actuation member 132 is configured in such a manner that it can move the outlet flap 130 from a closed position into an open position (at a predetermined opening angle) or it can move the outlet flap 130 from the open position into the closed position. The outlet flaps 130 are supported in an articulated manner in the outer wall 125. In FIG. 2, for reasons of illustration, only an actuation member 132 is shown. However, it should be understood that a plurality of actuation members 132 may be provided, of which one is coupled to an outlet flap 130 in each case.

Figure 3:
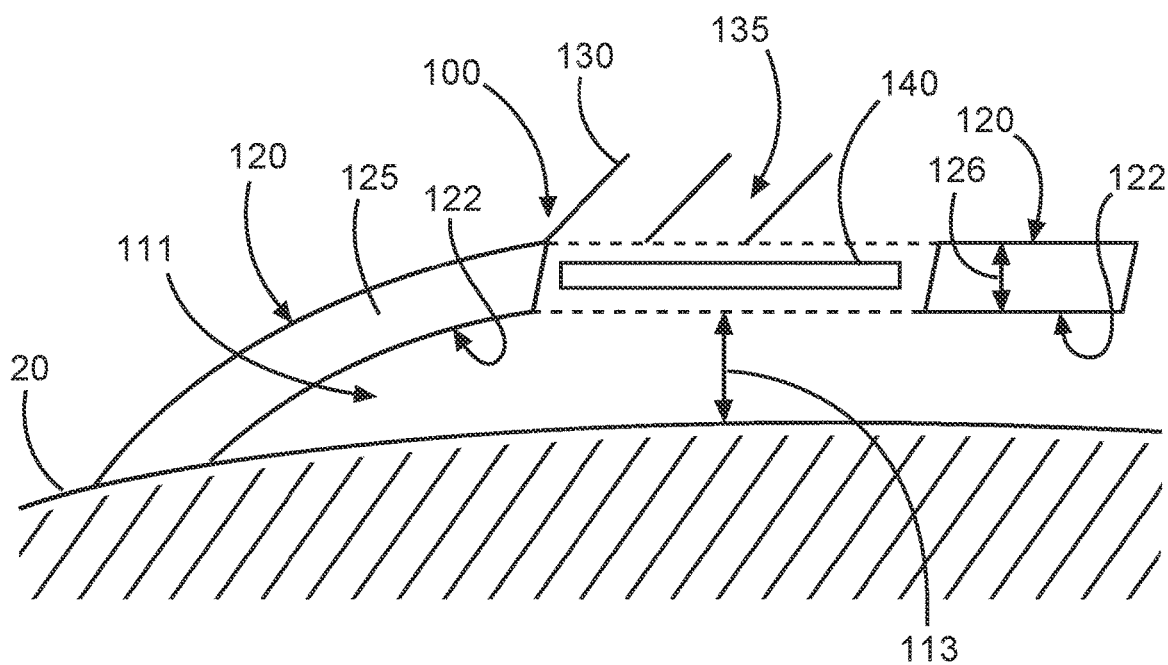
FIG. 3 is a schematic illustration of an air direction arrangement according to another embodiment.

FIG. 3 shows the structure from FIG. 2, wherein the heat exchanger 140 which is arranged in the outlet channel 135 is also shown. The structure of the air direction arrangement 100 shown in FIG. 3 corresponds to the structure shown in FIG. 2 and is not described again at this point.

As can be seen in FIG. 3, the heat exchanger 140 is located in the outlet channel 135 and is sized in such a manner that the heat exchanger 140 does not protrude over the inner side 122 of the outer wall 125 into the inlet channel 111 and also does not protrude beyond the outer skin 120 of the outer wall 125 into the environment of the aircraft. Along the outlet channel 135, the inner side 122 and the outer skin 120 are continued with a dashed line in order to identify precisely this relationship. The thickness 126 of the outer wall 125 is determined as the spacing between the inner side 122 and the outer skin 120. As can be seen in FIG. 3, the heat exchanger 140 has a height which is lower than the thickness 126 of the outer wall 125.

With respect to the inner side 122, the inlet channel 111 has a flow cross section 113. The heat exchanger 140 is arranged in such a manner in the outlet channel 135 that it does not protrude into the flow cross section 113 of the inlet channel 111 and the air flow between the inlet opening 110 and engine 30 (see FIG. 2) is not subjected to an increased flow resistance.

In addition, it should be noted that "comprising" or "having" does not exclude any other elements or steps and "one" or "a" does not exclude a large number. Furthermore, it should be noted that features or steps which have been described with reference to one of the above embodiments can also be used in combination with other features or steps of other embodiments described above. Reference numerals in the claims are not intended to be considered to be a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 Aircraft
20 Fuselage
30 Engine
100 Air direction arrangement
110 Inlet opening
111 Inlet channel
112 Air flow
113 Flow cross section
120 Outer skin
122 Inner side
125 Outer wall
126 Thickness of the outer wall
130 Outlet element
132 Actuation member
135 Outlet channel
140 Heat exchanger

The invention claimed is:

1. An air direction arrangement for an aircraft comprising:
an inlet opening and an inlet channel connected thereto,
the inlet channel being at least partially surrounded by an outer wall and configured to guide a flow of air to an engine of the aircraft, wherein:
the outer wall comprises an outlet channel and an outlet element; and
the outlet element is configured to selectively release or close the outlet channel for controlling an air flow from the inlet channel into an environment of the aircraft; and
a heat exchanger in the outlet channel, the heat exchanger being configured to discharge thermal energy into the airflow flowing from the inlet channel and through the outlet channel, into the environment of the aircraft;
wherein, in a direction perpendicular to a flow direction of the flow of air in the inlet channel, the heat exchanger has a height that is lower than a width of the outer wall;
wherein the heat exchanger is arranged in the outlet channel such that an inner side of the outer wall is closer to the fuselage of the aircraft than the heat exchanger and an outer skin of the outer wall is further away from the fuselage of the aircraft than the heat exchanger;
wherein the heat exchanger is arranged such that, when the outlet channel is closed, the flow of air through the inlet channel flows to the engine, past the heat exchanger, such that the heat exchanger does not discharge any thermal energy into the flow of air and, when the outlet channel is released, only the airflow through the outer channel flows through the heat exchanger, the air flow being transverse relative to the inlet channel; and
wherein the heat exchanger is sized to not protrude beyond the inner side of the outer wall, into the inlet channel, and also to not protrude beyond the outer skin of the outer wall, into the environment of the aircraft.

2. The air direction arrangement according to claim 1, wherein the heat exchanger is outside a flow cross section which is at least partially surrounded by the inlet channel between the inlet opening and the engine.

3. The air direction arrangement according to claim 1, comprising a plurality of outlet elements which together close the outlet channel in which the heat exchanger is arranged.

4. The air direction arrangement according to claim 1, further comprising:
a plurality of outlet channels; and
wherein a respective heat exchanger is arranged in each one of at least two outlet channels of the plurality of outlet channels.

5. The air direction arrangement according to claim 1, wherein the heat exchanger is a plate heat exchanger.

6. The air direction arrangement according to claim 1, comprising an actuation member, which is mechanically coupled to the outlet element and is configured to move the outlet element from a closed position into an open position.

7. The air direction arrangement according to claim 1, wherein the outlet element is an outlet flap and extends, in a closed position, flush with the outer skin of the outer wall.

8. An aircraft comprising:
a fuselage;
an engine; and
an air direction arrangement according to claim 1, wherein the air direction arrangement is on or in the fuselage and is arranged to supply the engine with air.

9. The aircraft according to claim 8, wherein:
the aircraft is a jet aircraft; and
the engine is a jet engine or a ramjet engine.

* * * * *